United States Patent [19]
Walsh

[11] 3,708,343
[45] Jan. 2, 1973

[54] PRIMARY CELL CASE
[75] Inventor: Gerrard Walsh, Durham County, N.C.
[73] Assignee: Timex Corporation, Waterbury, Conn.
[22] Filed: Jan. 18, 1971
[21] Appl. No.: 107,388

[52] U.S. Cl. .................................. 136/133, 136/169
[51] Int. Cl. ............................................... H01m 1/02
[58] Field of Search ............... 136/133, 166, 169, 111

[56] References Cited
UNITED STATES PATENTS 2,536,696  1/1951  Ruben ................................ 136/111
3,418,172  12/1968  Fletcher ............................. 136/111
3,340,099  9/1967  Sherfey ............................. 136/133

Primary Examiner—Donald L. Walton
Attorney—Richard A. Joel

[57] ABSTRACT

A primary cell of the button type having a case comprising a bottom can including a top open end, a top cap having a descending flange and a skirt at the end thereof and an annular grommet. The skirt portion of the top cap is adhered to the grommet with an adhesive, such as an epoxy resin, and the open end of the bottom cap is swaged against the grommet to complete the seal. An auxiliary cap having downwardly extending end portions is mounted over the top cap.

5 Claims, 3 Drawing Figures

PATENTED JAN 2 1973

3,708,343

INVENTOR.
GERRARD WALSH
BY
Richard A. Joel
ATTORNEY

PRIMARY CELL CASE

BACKGROUND OF THE INVENTION

The present invention relates to primary cells and more particularly to a construction for the sealing of button type cells:

The small primary energy cells used, for example, in watches and hearing aids, are generally called button cells because of their shape and small size. For example, one type of such cell is a round cell having a height of 0.21 inch and a diameter of 0.45 inch. These cells are generally alkaline primary cells. A typical cell of this type uses a zinc amalgam anode, a mercuric oxide cathode, and an alkaline electrolyte such as potassium hydroxide.

The potassium hydroxide is a strongly corrosive liquid which has a tendency to creep, that is, it will climb up the sides of an enclosing vessel. The alkaline electrolyte, and the gases produced in the cell, have presented serious problems in the sealing of cells. The alkaline electrolyte, if it should leak from the cell, may not only ruin the cell itself but also cause damage to the possibly delicate and expensive device in which the cell is used. Similarly, the gases which might escape from the cell may be corrosive to the device. This problem of leakage of the cell is particularly serious in the case of wrist watches. The wrist watch uses many parts which would be adversely affected by the corrosion occasioned by the leakage of an energy cell within the watch case.

There have been various solutions proposed for the problem of sealing small button type battery cells. For example, it has been proposed that a valve system be incorporated in the energy cell to permit the escape of gas or that an absorbent material be placed in the path of possible leakage to absorb and liquid which may pass the seal. Such devices have not proven entirely satisfactory in the sealing of cells and have subtracted from the amount of active material which may be incorporated in the cell. If a seal were found which would be truly effective in sealing the energy cell against gas and alkaline leakage and which would not add appreciably to the size of the cell, then it would be possible to use a higher weight of electrolyte in the cell, or possibly greater quantities of anode or cathode material, thereby achieving a greater cell capacity for the same size of cell.

It is the objective of the present invention to provide a button type primary energy cell which is effectively and completely sealed against leakage.

It is further objective of the present invention to provide such an energy cell in which the sealing does not substantially subtract from the quantity of active material which may be incorporated within the cell.

It is a further objective of the present invention to provide a sealing construction in such a cell which may be manufactured at relatively low cost.

SUMMARY OF THE INVENTION

In accordance with the present invention, an energy cell of the button type is provided. The cell includes a first can-like portion which is open at one end. A top cap is also provided, the top cap being substantially convex. A cathode is positioned within the bottom can member and an anode material and an electrolyte are positioned within the cap. A plurality of suitable separators are positioned between the anode and cathode prior to assembly of the energy cell.

The seal utilizes a flexible grommet. The grommet has a descending portion which fits within the bottom can member. A shoulder on the inside of the grommet supports a skirt portion of the top cap. Prior to sealing of the battery, an adhesive is placed on the skirt of the top cap and the grommet and the top cap are adhered together. Each sub-assembly, consisting of the top cap and the grommet, is individually tested for leakproofness prior to assembly of the cell. The top extending side wall of the button case is then swaged over to compress the grommet. A plastic auxiliary top cap is later assembled over to top cap and bonded thereto. The added cap provides further protection against cell leakage and reinforces the cell seal.

Other objectives of the present invention will be apparent from the following detailed description taken in conjunction with the accompanying drawings.

DETAILED DESCRIPTION

Figure 1:
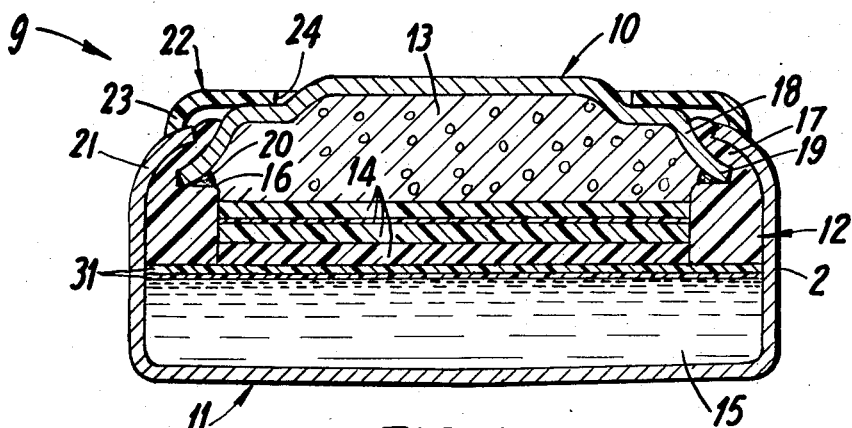
FIG. 1 is a side cross-sectional view of the battery of the present invention after assembly.

As shown is FIG. 1, the battery 9 of the present invention includes a top cap 10 which is formed from a conductive material, for example, of a duplex stainless steel-phosphor bronze material. The top cap provides one terminal of the cell, the other terminal being provided by the bottom can 11. An annular grommet 12 is positioned between top cap 10 and bottom can 11 and electrically insulates the two terminals of the cell. The top cap 10 contains the anode material 13, which may, for example, be a zinc amalgam which is compressed within the top cap. Prior to final assembly of the energy cell, a suitable alkaline electrolyte, such as potassium hydroxide or sodium hydroxide is added to the zinc amalgam anode.

The bottom can 11 contains a depolarizing cathode material 15 such as a mixture of mercuric oxide with a small percentage of graphite. One or more barrier plates 31, for example, of suitable plastic microporous membrane material, and plastic separators 14 are positioned between the anode and the cathode.

Figure 2:
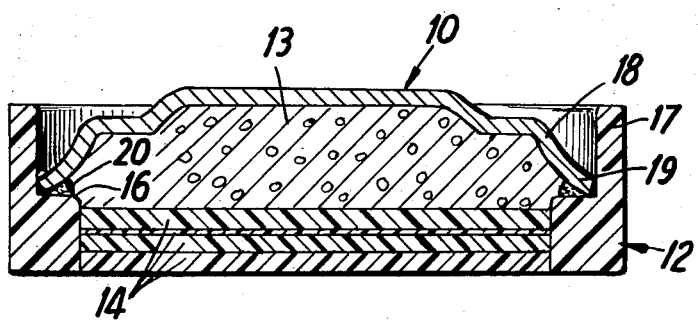
FIG. 2 is a side cross-sectional view of the anode assembly portion of that battery prior to assembly.
Figure 3:
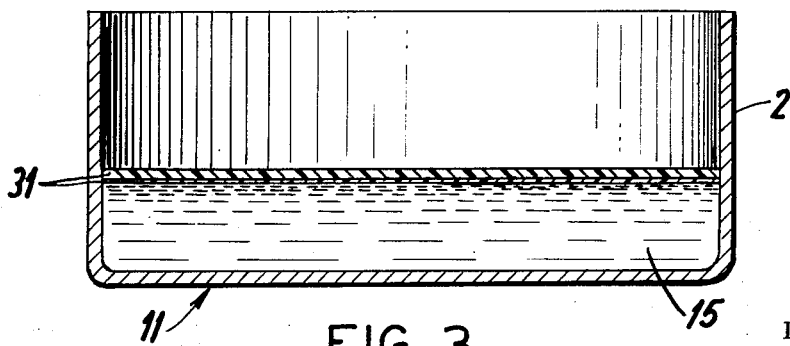
FIG. 3 is a side cross-sectional view of the cathode assembly portion of the battery of FIG. 1 prior to assembly.

As shown in FIG. 2, which is at the sub-assembly stage with the top cap 10 adhered to the grommet 12, the top cap 10 includes, as an integral portion, a descending flange portion 18 forming at its end a skirt 19. An adhesive 20 is placed on the skirt 19 and the top cap 10 positioned against grommet 12. A suitable adhesive 20 is a mixute of epoxy and polysulfide. The skirt portion 19 is held against the grommet for an hour under pressure, for example, of 20 grams. Each assembly is, after 24 hours, individually tested for its leakproofness with a pressure of 20 lbs. per square inch for 10 seconds.

If the assembly has proven to be leakproof, it is inverted and the zinc amalgam anode material is compressed within the top cap 10. The electrolyte is then added and the top cap 10 is joined, for example, in a fixture, with the bottom can 11. At that moment in the assembly operation, the grommet is still as shown in FIG. 2, with the flange portion 17 of the grommet still standing erect.

The final assembly consists of swaging over the free standing wall 2 of the bottom can 11 to form a tight seal against the grommet. The swage pressure may be about 1.75 tons. The grommet is held under pressure after the swaging operation is completed by the swaged-over wall portion 21.

In effect, there are three separate seals for the cell, all of which effectively prevent gas and liquid leakage. The first seal is the adhesive between the skirt 18 and the shoulder of the grommet 16. The second seal is the grommet itself which is under compression. The third seal is the auxiliary cap 22 which is assembled over the top cap 10 and joined to the bottom can 11 as well.

As mentioned above, an auxiliary cap 22 of a plastic material is later assembled over the top cap 10 to lengthen the leakage path and to serve as an additional seal. The auxiliary cap 22 includes a central aperture 24 extending therethrough and downwardly extending end portions 23 of a predetermined shaped configuration which are bonded to the bottom can 11. The cap 22 is pretreated, for example, in a solution of sulphuric acid and potassium dichromate and a coating of epoxy resin is applied to both the auxiliary cap 22 and the cell cap 10. The auxiliary cap 22 is then pressed onto the top cap 10 and bottom can and allowed to cure at ambient temperature.

It is to be understood that the above-described arrangements are merely illustrative examples of the application of the principles of the invention. Numerous other arrangements may be readily devised by those skilled in the art which will embody the principles of the invention and fall within the spirit.

I claim:

1. A button type of energy cell comprising a case containing active anode and cathode materials, said case comprising:
    a can-like member having an opening to receive the cathode material,
    a cap to receive the anode material having a skirt portion which is positioned within the opening of the can-like member,
    a flexible sealing annular grommet having in cross-section a flange portion forming a shoulder and an opening extending therethrough,
    an adhesive adhering the skirt portion to the shoulder of the grommet, and,
    means for separating the anode material from the cathode material,
    wherein the free wall of the can-like member is swaged to compress the grommet between the can-like member and the cap to seal the cell and said cell further including an auxiliary top cap having a central aperture and downwardly extending end portions, said auxiliary top cap being bonded to the cap and the upper free wall portion of the can-like member to provide a further seal.

2. An energy cell in accordance with claim 1 wherein:
    the adhesive joining the skirt portion to the shoulder of the grommet is an epoxy resin.

3. An energy cell in accordance with claim 1 wherein:
    the cap includes a central protruding portion, an intermediate shoulder portion and a peripheral downwardly extending skirt, said protruding portion being designed to extend through the aperture in the auxiliary top for contact purposes, and,
    the means separating the anode material from the cathode material comprises a first plurality of separators plates positioned within grommet opening and a second plurality of separators positioned within the can and separating the base of the grommet and the first plurality of separators from the cathode material.

4. An energy cell in accordance with claim 1 wherein:
    the anode material comprises a zinc amalgam having a alkaline electrolyte added thereto and,
    the cathode material comprises a mixture of mercuric oxide and graphite.

5. The method of sealing an energy cell, the cell comprising a case containing active anode and cathode materials, said case comprising a can-like member having a bottom and a cylindrical side wall, and a top opening, a cap having a skirt portion which is positioned within the opening, a flexible sealing annular grommet, said method comprising the steps of:
    a. adhering the skirt of the cap to the grommet,
    b. testing the adhesion of the skirt to the grommet for leakproofness,
    c. assembling the active material within the cap and the can-like member,
    d. positioning the grommet within the opening of the can-like member and separator means between the active material in the cap and the can-like member,
    e. swaging the free wall of the can-like member over the grommet to place the grommet under compression, and
    f. bonding an auxiliary top cap over the cap and upper portion of the can-like member to provide an additional seal.

* * * * *

UNITED STATES PATENT OFFICE
CERTIFICATE OF CORRECTION

Patent No. 3,708,343          Dated January 2, 1973

Inventor(s) GERRARD WALSH

It is certified that error appears in the above-identified patent and that said Letters Patent are hereby corrected as shown below:

On the cover sheet [75], "Durham County, N.C."

should read -- County Durham, England --.

Signed and sealed this 1st day of May 1973.

(SEAL)
Attest:

EDWARD M. FLETCHER, JR.                ROBERT GOTTSCHALK
Attesting Officer                      Commissioner of Patents